Dec. 11, 1951 R. I. BURTON 2,578,172
TRAP TUNNEL
Filed May 8, 1948
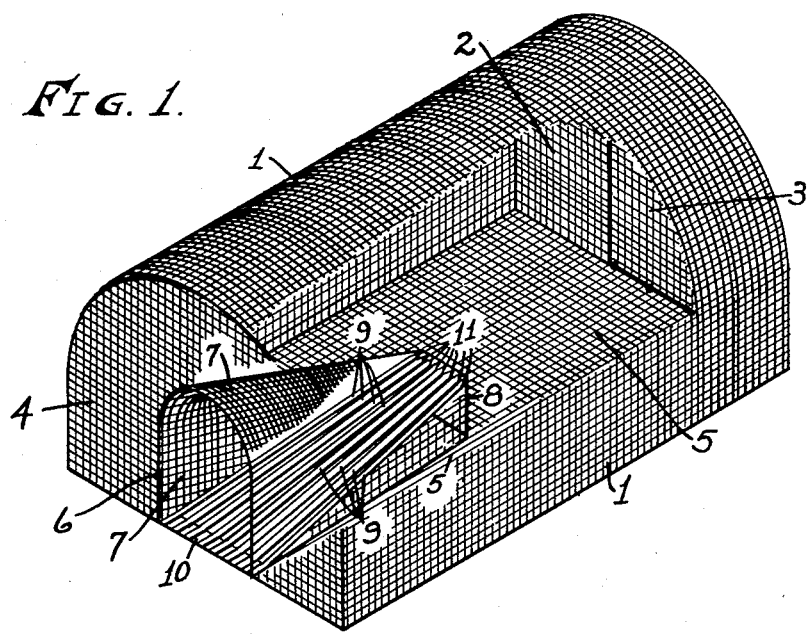
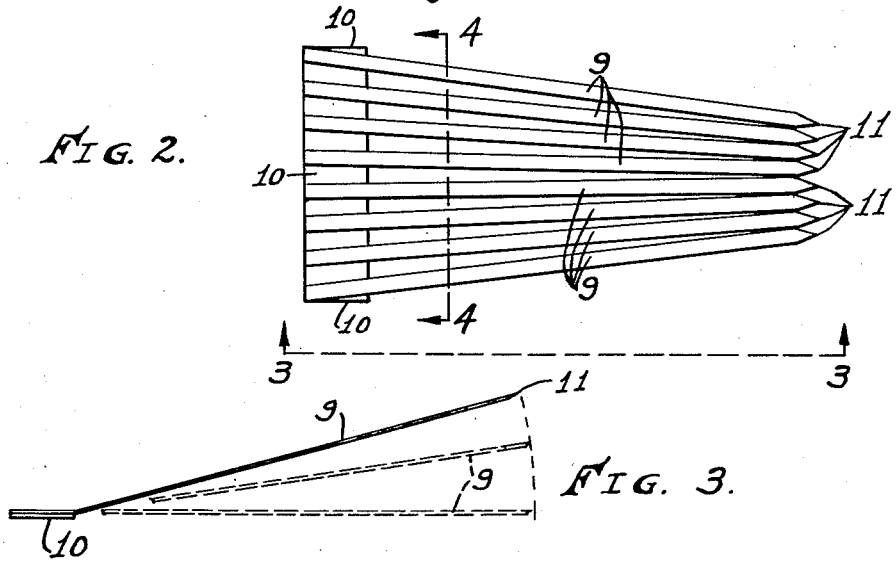
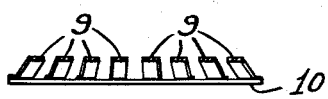
RUSSELL I. BURTON,
INVENTOR.
BY Donald E. Windle.
ATTORNEY.

Patented Dec. 11, 1951

2,578,172

UNITED STATES PATENT OFFICE 2,578,172

TRAP TUNNEL

Russell I. Burton, Richmond, Ind.

Application May 8, 1948, Serial No. 25,930

1 Claim. (Cl. 43—65)

The present invention relates to traps, and more especially to traps for the purpose of trapping rodents and reptiles. I am fully aware that traps for the above-mentioned purposes are old in the art, but the same are generally provided with hinged platforms leading into the traps. In the traps having hinged platforms, the hinged joints usually become rusted or corroded, and soon become inoperative and useless.

The main or principal object of the invention is the provision of a trap having resilient members forming the throat portion thereof which are easily displaced for entry into the trap.

A second object is the provision of a trap which prevents a reverse movement of a rodent or reptile after any portion thereof has passed the inner ends of members forming the throat portion thereof.

Another object is the provision of a trap which is effective and simple of operation, and which is economical to manufacture.

Other further objects and particular advantages of the invention will suggest themselves in the course of the following description, and that which is new will be pointed out in the appended claim.

The preferred, and most satisfactory manner for carrying out the principles of the invention in a practical manner is shown in the accompanying drawing, in which:

Figure 1 is a partial isometric view of a trap embodying the principles of the invention, with certain portions thereof being omitted for clarity of the invention.

Figure 2 is a top plan view of the throat members of the device.

Figure 3 is a side elevation of the throat members, taken from line 3—3 of Figure 2.

Figure 4 is a detail sectional detail through the throat members, taken on line 4—4 of Figure 2.

Similar characters of references designate like parts throughout the several views.

In order that the construction, the use, and the particular advantages of the invention may be more fully apparent, I will now take up a detailed description thereof in which the same will be more fully set forth.

Referring now to the drawings in detail, numeral 1 designates the outer longitudinal wall of the trap, and which is preferably formed of wire mesh in the conventional manner. 2 designates the rear end of the trap, with the same being also formed of wire mesh, and having an opening provided therein and adapted to be normally closed by means of a hinged door 3, and which is adapted to be latched in a closed condition. The trap is provided with a front end 4 and a floor 5, each of which are preferably formed of wire mesh.

The front end 4 has an opening 6 formed therein. Extending into the trap is a tunnel having its sides and top portion 7 formed of wire mesh and with the same terminating at its inner end in the frame 8 which is comparatively smaller than the opening 6.

The portion of the trap in which the invention resides is the tunnel or throat assembly comprised of members 9 which are preferably formed of resilient material and having one end thereof securely attached to a cross bar member 10. The cross bar member 10 is adapted to be rigidly secured to the floor 5 by means of welding or soldering thereto with the same being located at substantially the forward edge of the trap, as more clearly shown in Figure 1. The throat members 9 are arranged on the bar 10 so as to converge toward the rear ends thereof and form a substantially closed floor or ramp, and with the inner ends of the throat members having sharpened or pointed ends 11 formed thereon, as more clearly shown in Figure 2.

Each of the throat members 9 is bent at a slight upward angle at the plate 10, as shown in Figure 3, in order that the inner ends thereof may normally rest upwardly against inner frame 8 and preventing the egress of rodents or reptiles from within the trap. Each of the members 9 is independent of the other members 9 in the resilient upward and downward movements.

In the use of the trap, it is desirable to provide suitable bait within the trap. Upon entry of rodents or reptiles through the opening 6, the rodents or reptiles travel inwardly through tunnel 7, and with their weight on the throat members, cause the throat members contacted to be depressed downwardly as shown by the broken lines in Figure 3, and providing an opening at the frame 8 only of sufficient size to permit entry of the rodents or reptiles into the trap.

It will be obvious that, after any portion of a rodent or reptile passes the sharpened ends 11 of the throat members, it is impossible for it to reverse its motion and to withdraw through the tunnel portion as the sharpened ends 11 have a tendency to engage in the hide in a reverse movement.

Although the preferred form of trap is shown and described, I desire that it be understood that minor changes may be made in the several parts and in the arrangement thereof, insofar as the changes may fall within the scope of the appended claim.

Having now shown and described the invention, what I claim, is:

A tunnel for a trap, said tunnel having a floor consisting of a plurality of separate resilient members mounted in fixed relation to each other at one end of the tunnel and normally retained in position in closing relationship with the top of the tunnel at the other end thereof due solely to the resiliency of said members.

RUSSELL I. BURTON.

REFERENCES CITED

The following references are of record in the file of this patent:

UNITED STATES PATENTS

| Number | Name | Date |
|---|---|---|
| 366,802 | White | July 19, 1887 |
| 527,044 | Brown | Oct. 9, 1894 |
| 821,199 | Strawbridge | May 22, 1906 |
| 872,556 | Carwile | Dec. 3, 1907 |
| 1,063,857 | Cook | June 3, 1913 |
| 1,208,677 | Smith | Dec. 12, 1916 |